Dec. 22, 1964   J. S. CZAPIEWSKI   3,161,952
METAL BARREL OR DRUM TOP CUTTER
Filed Oct. 7, 1963   2 Sheets-Sheet 1

INVENTOR
JOSEPH S. CZAPIEWSKI
Joseph S. Czapiewski
BY
ATTORNEY

Dec. 22, 1964     J. S. CZAPIEWSKI     3,161,952
METAL BARREL OR DRUM TOP CUTTER

Filed Oct. 7, 1963     2 Sheets-Sheet 2

INVENTOR
JOSEPH S. CZAPIEWSKI

BY *Joseph S. Czapiewski*

ATTORNEY

United States Patent Office 3,161,952
Patented Dec. 22, 1964

3,161,952
METAL BARREL OR DRUM TOP CUTTER
Joseph S. Czapiewski, 805 E. Locust St., Milwaukee, Wis.
Filed Oct. 7, 1963, Ser. No. 314,133
1 Claim. (Cl. 30—4)

This invention relates to an improvement in a machine for cutting and removing drum barrel heads.

U.S. Patent No. 2,886,887 was issued to William M. Krist and myself concerning the cutting and removal of drum barrel heads. This patent proved satisfactory generally but displayed certain disadvantages. One such disadvantage was that the patented machine, because of its unbalanced and overhanging design that includes a yoke assembly for engaging the machine with the side walls of the drum, proved difficult and dangerous to operate. Also, there was a frequent need, after the machine had been operating for a period of time, to replace the rocker block due to its tendency to become worn. A further disadvantage prevalent with the patented machine, was the tendency of its feed wheel and cutter to become loosened during the operation due to the constant rotation of the cutter and drive shaft since the only attachment to the respective shafts was limited to the utilization of Allen set screws. Still further, there was no adjustment provided on the machine for varying the height of the cut on the drum bead or rim thereby to take into consideration numerous sizes of drums whose heads must be removed.

This present invention retains the general construction of the cutter mechanism of the patent but rearranges and simplifies parts in such a manner as to provide a new balance and a different center of gravity for the present machine as compared with the prior machine to make the operation of the cutter independent of the weight of the machine. This new balance is the result of placing substantially all of the machine weight inside of the drum head circumference, thereby eliminating the overhanging load on the side of the drum. This new arrangement simplifies the placing of the machine onto the drum for the cutting operation, thereby minimizing the danger of accident by possibly upsetting a partially filled drum as can occur in connection with the patented machine. This present invention eliminates the need for the unreliable rocker block by the utilization of a spherical bearing to support the arching shaft. This present invention further mounts a drive wheel with either right or left hand threads on its shaft and a cutter and cutter shoulder, with opposite threads to the drive wheel, on its shaft and thereby eliminates the need for the former Allen screw attaching means and makes it possible to adjust the height of cut on the drum head by the insertion of washers between the cutter and cutter shoulder. These improvements of the patented device not only lessen the danger of accident, as mentioned above, but also make the setting and adjustment of the new machine to a particular type of drum less laborious and almost completely proof against improper operation by even the inexperienced persons.

The invention consists in the novel construction, arrangement and formulation of parts, as will be hereinafter more specifically defined and claimed and illustrated in the accompanying drawings, in which drawings:

Figure 1:
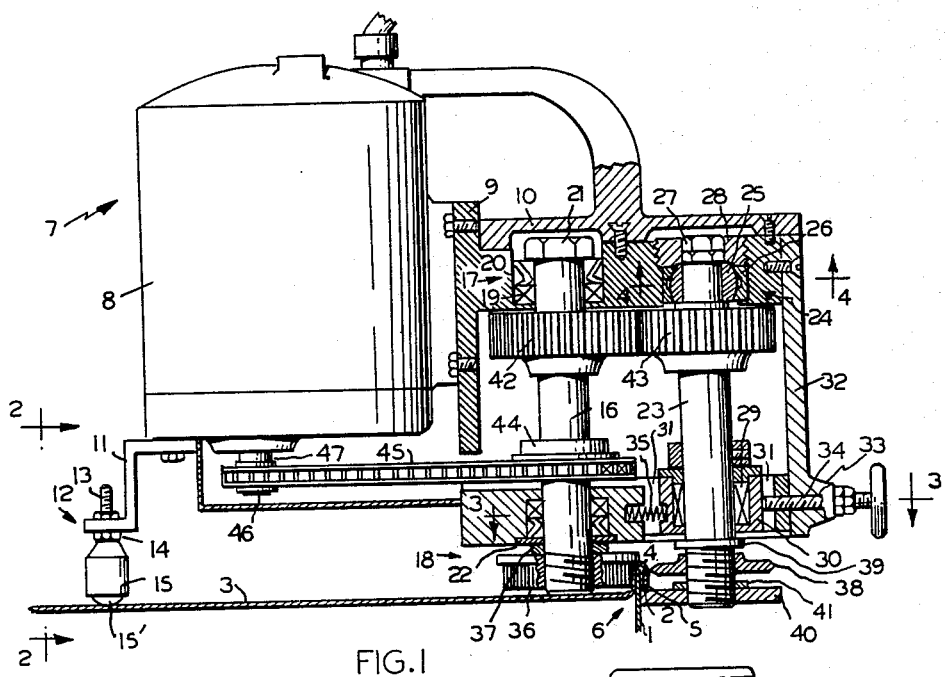
FIGURE 1 is a side elevation, partially in section, of the present machine with a vertical shaft electric motor drive.
Figure 3:
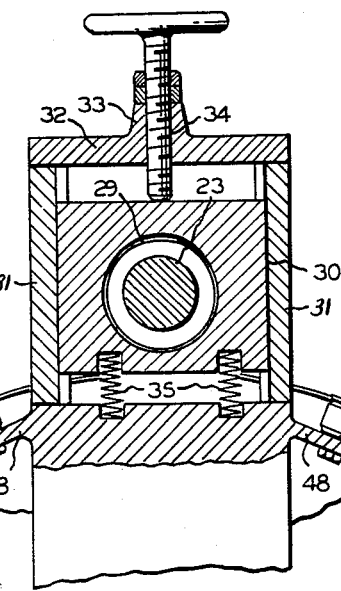
FIGURE 3 is a cross-sectional view on the horizontal plane 3—3 of FIGURE 1 to illustrate the relationship of the drive wheel, guide wheels and the cutter all mounted on the main frame.
Figure 2:
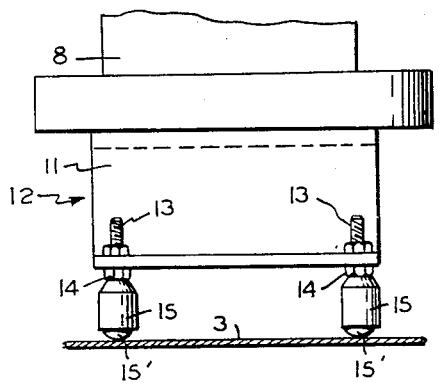
FIGURE 2 is a fragmentary elevated view on the side indicated by 2—2 in FIGURE 1.

Referring specifically to the drawings, a substantial metal drum 1 has side walls folded outwardly as at 2 to form a double thickness for receiving a drum head 3 with flange 4 turned back on itself as at 5. The metal parts are pressed together to form a bead or rim, generally indicated by 6, thereby providing a liquid-tight joint. The above structure is one conventional type of drum and head structure and provides a substantial inner peripheral head surface and an end surface on which the present cutting machine operates.

This novel machine, generally indicated by 7 contains an upright motor 8 mounted against the vertical rear plate 9 of a main frame 10. A support frame 11 is attached to the motor 8 opposite the plate 9 and extends downwardly from beneath the motor 8. Attached to the lower extremities of the support frame 11 are feet 12 comprising a threaded vertical extension 13, for adjustable attachment with legs 11 by means of bolts 14, and cup 15, attached thereto, for rotatably receiving a ball 15' that rides on top of the drum barrel 3 when the machine is in operation.

The main frame 10 provides a mounting for a first vertical shaft 16 which is rotatable about a fixed axis and within an upper and lower pair of bearing assemblies generally indicated by 17 and 18, respectively, comprising a set of, both, ball bearings 19 and Timken bearings 20. The upper bearing assembly 17 is mounted within the frame 10 and is held on the shaft 16 by lock nut 21 while the lower bearing assembly 18 is held in place by shoulder 22.

The main frame 10 also provides a mounting for a second shaft 23 which is rotatably supported in an upper spherical bearing 24, comprising a ball 25 and socket portion 26 which, in turn, is held in place around the shaft 23 by means of two half nuts 27 and a threaded collar 28. The lower portion of the shaft 23 is further rotatable within a needle bearing 29 located within a slide block 30 which is supported by guideways 31 within the lower portion of main frame 10.

The main frame 10 is provided with an end plate 32 which contains a threaded boss 33 for receiving an adjustable screw 34 acting on the second shaft 23 against a compression spring 35. Thus it can be seen that the second shaft 23 can swing in an arc toward or away from the first shaft 16 along the guideways 31 of the lower portion of the main frame 10.

The knurled drive wheel 36 which abuts against flange 5 of the drum is mounted on the first shaft 16 by means of right handed threads and during use moves up against a flange 37 on the first shaft 16 so that the knurled drive wheel 36 is always in a relatively fixed position on the shaft 16. The cutter disc 38 is mounted with a left hand thread on the second shaft 23 and during use moves up against the flange 39 in its shaft 23 to remain in a relatively fixed position thereon. Threaded onto the second shaft 23 and beneath the cutter disc 38 is a guide shoulder 40 which, when in operating position, abuts against the bead flange 5. This guide shoulder 40 makes it possible for the cut to be made at the same height on the bead flange 5 around its whole periphery. Located between the cutter disc 38 and the flange shoulder 40 is a spacer washer 41. It is to be noticed that as you increase or decrease the number of spacer washers 41 between the cutter disc 38 and flange shoulder 40, the height of the cut on the flange 5 of the drum head will vary so as to make the cutter adjustable.

The two shafts 16 and 23 are severally provided with gears 42 and 43 shaped so as to mesh regardless of the angle of the second shaft 23 to the first shaft 16 within the limits of the guideways 31. A sprocket 44 is fixed on the first shaft 16 and is connected by way of a chain 45 with a sprocket 46 on the shaft 47 of an electric motor 8.

The main frame 10 further has two side extensions 48 and attached thereto are guide rollers 49 having surfaces 50 for bearing or riding on the drum bead or rim 6.

In operation of the improved drum cutter, the adjustable screw 34 is loosened or threaded outwardly so as to permit the cutter disc 38 to move away from the drive wheel 36. The apparatus is now placed on the drum head 3 with guide rollers 49 engaging the rim 6 of the drum and balls 15' resting on the drum head surface 3. The screw 34 is threaded inwardly and the cutter disc 38 is accordingly brought into bighting contact with the rim 6. The circuit to the motor is closed whereupon the drive wheel 36 and the cutter disc 38 will be rotated and the cutter 38 will travel around the entire circumference of the bead or rim 6. This will bring about the severing of the bead 6 and the cutting off of the top of the drum. The compression spring 35 bears against the slide block 30 and functions to hold this block 30 down on its guideways 31.

In actual practice, upon traveling of the device around the drum once, the screw 34 can be again adjusted to bighting contact and the device is allowed to travel around the drum again. This insures the cutting of the rim entirely through.

Figure 5:
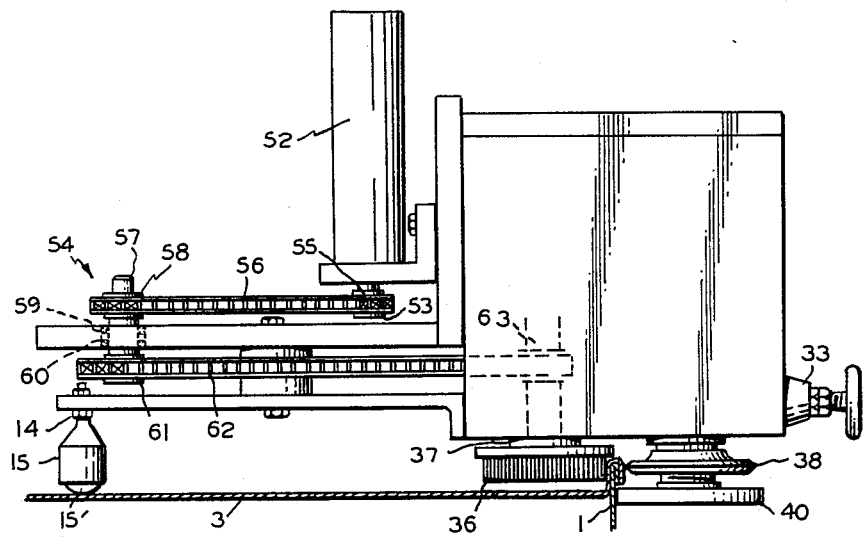
FIGURE 5 is an illustration showing a modification of the present invention.
Figure 4:
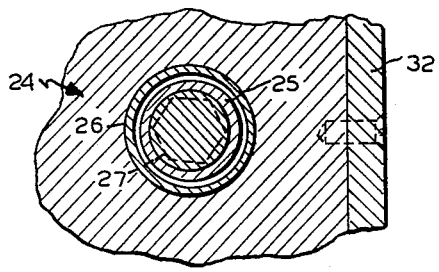
FIGURE 4 is a cross-sectional view on the horizontal plane 4—4 illustrating the spherical bearing.

In the modified embodiment of this invention, as shown in FIGURE 5, there is illustrated in place of the electric motor, an air motor 52 operable with compressed air. The speed of its rotating shaft 53 is geared down by means of a double reduction gear assembly, generally indicated by 54, comprising a sprocket 55 fixed on the air motor shaft 53 connected by way of chain 56 with an intermediate shaft 57 by means of an upper sprocket 58. The shaft 57 is rotatable within bearing 59 and 60, contains a lower sprocket 61 and is connected by a chain 62 with a sprocket 63 on the first shaft 16.

It is to be understood, however, that in some instances the first shaft 16 can carry a cutter disc 38 and that the second shaft 23 can carry a drive wheel 36 so that the cut can be made from the interior of the barrel bead or rim should such be desired.

Other changes may be made in detail without departing from the spirit or the scope of this invention, but what is claimed as new is:

In a power driven machine for cutting a flanged head free from a metal drum, a main frame for movement peripherally of the drum, a first shaft rotatable on a fixed axis in the main frame, a drive wheel mounted by means of right hand threads on the first shaft to engage with the drum head, a spherical bearing mounted in the main frame, a second shaft mounted at one end in the spherical bearing and driven by the first shaft, a cutter mounted by means of left hand threads on the second shaft adjacent the other end thereof for swinging on an arc toward and away from the drive wheel and for bearing on a flange of the drum head opposite the drive wheel, a guide shoulder mounted on the end of the second shaft beyond the cutter, adjustable spacer washer disposed between said cutter and said guide shoulder, means for driving the cutter shaft from the first shaft, a pair of guide wheels rotatably mounted on the main frame, the guide wheels severally being at each side of the drive wheel for bearing on the end of the drum and on a vertical surface of the drum head, a support frame attached to the main frame, and means adjustably mounted on the support frame for movably bearing on the drum head whereby the drive wheel is adjustable for maximum bearing on a head flange as the machine moves peripherally of the drum and over the drum head.

References Cited by the Examiner

UNITED STATES PATENTS

| | | | |
|---|---|---|---|
| 1,602,832 | 10/26 | O'Brien. | |
| 1,846,905 | 2/32 | Pesola. | |
| 2,138,538 | 11/38 | Fluharty | 30—15.5 |
| 2,728,983 | 1/56 | Mugavero | 30—4 X |
| 2,886,887 | 5/59 | Krist et al. | 30—4 |

WILLIAM FELDMAN, *Primary Examiner.*
MICHAEL BALAS, *Examiner.*